(12) United States Patent
Piel

(10) Patent No.: US 11,348,116 B2
(45) Date of Patent: May 31, 2022

(54) SYSTEMS AND METHODS FOR ENHANCING ONLINE USER AUTHENTICATION USING A PERSONAL CLOUD PLATFORM

(71) Applicant: MASTERCARD INTERNATIONAL INCORPORATED, Purchase, NY (US)

(72) Inventor: Brian Piel, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 845 days.

(21) Appl. No.: 15/805,985

(22) Filed: Nov. 7, 2017

(65) Prior Publication Data
US 2019/0139044 A1   May 9, 2019

(51) Int. Cl.
*G06Q 20/40* (2012.01)
*G06Q 20/30* (2012.01)
(Continued)

(52) U.S. Cl.
CPC ......... *G06Q 20/405* (2013.01); *G06F 21/316* (2013.01); *G06Q 20/30* (2013.01);
(Continued)

(58) Field of Classification Search
CPC .. G06Q 20/405; G06Q 20/30; G06Q 20/3226; G06Q 20/40; G06Q 20/4016;
(Continued)

(56) References Cited

U.S. PATENT DOCUMENTS

| | | |
|---|---|---|
| 7,924,139 B2 | 4/2011 | Sasakura et al. |
| 8,275,672 B1 | 9/2012 | Nguyen et al. |

(Continued)

FOREIGN PATENT DOCUMENTS

| | | |
|---|---|---|
| JP | 2002084548 A1 | 8/2004 |
| JP | 2006090476 A1 | 7/2008 |

(Continued)

OTHER PUBLICATIONS

Pavlovski, et al. "Unified Framework for Multifactor Authentication," 2015, 22nd International Conference on Telecommunications (ICT), pp. 209-213. (Year: 2015).*

(Continued)

*Primary Examiner* — Alexander G Kalinowski
*Assistant Examiner* — Alison L. Lamb
(74) *Attorney, Agent, or Firm* — Armstrong Teasdale LLP

(57) ABSTRACT

A personal cloud authentication (PCA) system for authenticating an online user using device data stored on a personal cloud platform of the user is provided. The PCA system configured to build an authentication table using a user profile that includes at least user account information. The PCA system is also configured to receive transaction data associated with the user account information and store the transaction data within a database, wherein the transaction data includes at least an authentication request, a second primary user computing device identifier and a second secondary user computing device identifier. The PCA system is further configured to parse the transaction data, match the first primary user computing device identifier to the second primary user computing device identifier and the first secondary user computing device identifier to the second secondary user computing device identifier, generate an authentication response based on the match, and transmit the authentication response.

21 Claims, 6 Drawing Sheets

(51) Int. Cl.
  *G06F 21/31* (2013.01)
  *G06Q 20/32* (2012.01)
  *H04L 9/40* (2022.01)

(52) U.S. Cl.
  CPC ......... *G06Q 20/3226* (2013.01); *G06Q 20/40* (2013.01); *G06Q 20/4016* (2013.01); *H04L 63/083* (2013.01); *H04L 63/0853* (2013.01); *H04L 63/0861* (2013.01); *G06Q 20/40145* (2013.01)

(58) Field of Classification Search
  CPC ............ G06Q 20/40145; G06F 21/316; H04L 63/083; H04L 63/0853; H04L 63/0861
  USPC .......................................................... 705/44
  See application file for complete search history.

(56) References Cited

U.S. PATENT DOCUMENTS

| | | | |
|---|---|---|---|
| 8,627,438 | B1 | 1/2014 | Bhimanaik |
| 9,065,824 | B1 | 6/2015 | Valdivia |
| 9,178,890 | B1 | 11/2015 | Bhimanaik |
| 9,532,225 | B2 | 12/2016 | Mackenzie et al. |
| 9,654,332 | B1 | 5/2017 | Meoli et al. |
| 10,445,732 | B2 * | 10/2019 | Oberheide ............ H04W 12/06 |
| 2010/0010944 | A1 | 1/2010 | Cheng et al. |
| 2013/0226812 | A1 | 8/2013 | Landrok et al. |
| 2013/0232083 | A1 | 9/2013 | Smith et al. |
| 2014/0089526 | A1 | 3/2014 | Schmidt |
| 2014/0129599 | A1 * | 5/2014 | Boccon-Gibod ... G06F 16/9535 707/827 |
| 2014/0143137 | A1 | 5/2014 | Carlson |
| 2014/0181916 | A1 | 6/2014 | Koo et al. |
| 2015/0066768 | A1 | 3/2015 | Williamson et al. |
| 2015/0142667 | A1 | 5/2015 | Landrok et al. |
| 2015/0363581 | A1 | 12/2015 | Ranadive et al. |
| 2015/0363785 | A1 | 12/2015 | Perez et al. |
| 2016/0117673 | A1 | 4/2016 | Landrok et al. |
| 2016/0196558 | A1 * | 7/2016 | Mercille ............... G06Q 20/327 705/44 |
| 2016/0269381 | A1 * | 9/2016 | Paul .................... H04L 63/0853 |
| 2017/0085568 | A1 | 3/2017 | Rolfe et al. |
| 2017/0126640 | A1 * | 5/2017 | Vincent ............... H04L 63/0853 |

FOREIGN PATENT DOCUMENTS

| | | |
|---|---|---|
| JP | 2017111667 A | 6/2017 |
| JP | 2017173987 A | 9/2017 |
| JP | 2018515011 A | 6/2018 |
| WO | 2002084546 A1 | 10/2002 |
| WO | 2016155497 A1 | 10/2016 |
| WO | WO-2018039377 A1 * | 3/2018 ............ H04W 12/06 |

OTHER PUBLICATIONS

European Extended Search Report, Application No. 18199659.6, dated Feb. 27, 2019, 7 pps.

* cited by examiner

SYSTEMS AND METHODS FOR ENHANCING ONLINE USER AUTHENTICATION USING A PERSONAL CLOUD PLATFORM

BACKGROUND

The field of the disclosure relates generally to enhancing authentication processes and, more specifically, to methods and systems for authenticating an online user using device data stored on a personal cloud platform of the user.

Personal cloud platforms enable online users to access digital content and services from any user device in communication with a personal cloud platform. The personal cloud platform also enables user devices to store, synchronize, stream, and share content. At least some personal cloud platforms are setup using a network. The network may include a router that enables user devices to communicate with each other. The network may also include user devices that are equipped with wireless technology, such as Bluetooth™ technology, that enables such user devices to exchange data over short distances and build personal cloud platforms without requiring additional devices besides the user devices. In order to prevent unauthorized users to access the data being exchanged, the user devices and applications included in such user devices require users to authenticate themselves before accessing the user devices and/or the applications. Some of these applications may be configured to perform payment transactions.

At least some payment transactions involve fraudulent activity. These fraudulent payment transactions present liability issues to one or more parties involved in the payment transaction, such as an issuing bank, a merchant, or a payment processing network, by authorizing payment transactions initiated by a user. As such, these parties are interested in fraud detection or the ability to analyze the data surrounding payment transactions before authorizing the payment transactions. For example, in online payment transactions through a merchant web site or "card-not-present" (CNP) payment transactions, the merchant party in the payment transaction may assume initial liability for certain aspects of the payment transaction unless, for example, certain risk-mitigating steps are taken.

These risk-mitigating steps may involve authentication of the user. For example, some payment networks engage an authentication service that performs an authentication of a suspect consumer prior to authorization of the payment transaction. The authentication service determines if the initiator of the payment transaction is the authorized user of a payment account and/or payment card used in the payment transaction. The authentication service may take time to determine the payment transaction is not part of fraudulent activity, and thus, delaying the authorization process. In addition to the authentication system, many known systems also use a fraud scoring system to detect potentially fraudulent payment transactions. However, these systems may take time as well. Although known systems exist, there exists a need for more advanced and efficient authentication systems.

BRIEF DESCRIPTION OF THE DISCLOSURE

In one aspect, A personal cloud authentication (PCA) system for authenticating an online user using device data stored on a personal cloud platform of the user is provided. The PCA system includes one or more personal cloud authentication (PCA) computing devices that include a processor communicatively coupled to a memory and is configured to build an authentication table using a user profile that includes a user identifier, authentication signatures, user account information, and a first primary user computing device identifier, and a first secondary user computing device identifier. The PCA system is also configured to receive transaction data associated with the user account information and store the transaction data within a database, wherein the transaction data includes at least an authentication request, a second primary user computing device identifier and a second secondary user computing device identifier. The PCA system is further configured to parse the transaction data, extract the second primary user computing device identifier and the second secondary user computing device identifier from the transaction data, and match the first primary user computing device identifier to the second primary user computing device identifier and the first secondary user computing device identifier to the second secondary user computing device identifier. The PCA system is also configured to generate, in response to the authentication request, an authentication response based on the match and transmit the authentication response to a merchant.

In another aspect, a computer-implemented method for authenticating an online user using device data stored on a personal cloud platform of the user is provided. The method is performed using one or more personal cloud authentication (PCA) computing devices that include a processor communicatively coupled to a memory. The method includes building an authentication table using a user profile that includes a user identifier, authentication signatures, user account information, and a first primary user computing device identifier, and a first secondary user computing device identifier. The method also includes receiving transaction data associated with the user account information and storing the transaction data within a database, wherein the transaction data includes at least an authentication request, a second primary user computing device identifier and a second secondary user computing device identifier. The method further includes parsing the transaction data, extracting the second primary user computing device identifier and the second secondary user computing device identifier from the transaction data, and matching the first primary user computing device identifier to the second primary user computing device identifier and the first secondary user computing device identifier to the second secondary user computing device identifier. The method also includes generating, in response to the authentication request, an authentication response based on the matching and transmitting the authentication response to a merchant.

In yet another aspect, a non-transitory computer readable medium that includes executable instructions for authenticating an online user using device data stored on a personal cloud platform of the user is provided. When the computer executable instructions are executed by one or more personal cloud authentication (PCA) computing devices that include a processor communicatively coupled to a memory, the computer executable instructions cause the one or more PCA computing device to build an authentication table using a user profile that includes a user identifier, authentication signatures, user account information, and a first primary user computing device identifier, and a first secondary user computing device identifier. The computer executable instructions also cause the one or more PCA computing device to receive transaction data associated with the user account information and store the transaction data within a database, wherein the transaction data includes at least an authentication request, a second primary user computing device identifier and a second secondary user computing device identifier. The computer executable instructions further cause the one or more PCA computing device to parse the transaction data, extract the second primary user computing device identifier and the second secondary user computing device identifier from the transaction data, and match the first primary user computing device identifier to the second primary user computing device identifier and the first secondary user computing device identifier to the second secondary user computing device identifier. The computer executable instructions also cause the one or more PCA computing device to generate, in response to the authentication request, an authentication response based on the match and transmit the authentication response to a merchant.

BRIEF DESCRIPTION OF THE DRAWINGS

FIG. 1 is a schematic diagram illustrating an example personal cloud authentication (PCA) system in communication with a multi-party payment processing system in accordance with the present disclosure.

FIG. 2 is a simplified block diagram of an example PCA system used for authenticating a user using a personal cloud of the user in accordance with FIG. 1.

FIG. 3 illustrates an example configuration of a user system shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process for authenticating a user using a personal cloud of the user using the PCA system shown in FIG. 2.

FIG. 6 is a diagram of components of one or more example computing devices that may be used in the PCA system shown in FIG. 2.

DETAILED DESCRIPTION

Figure 1:
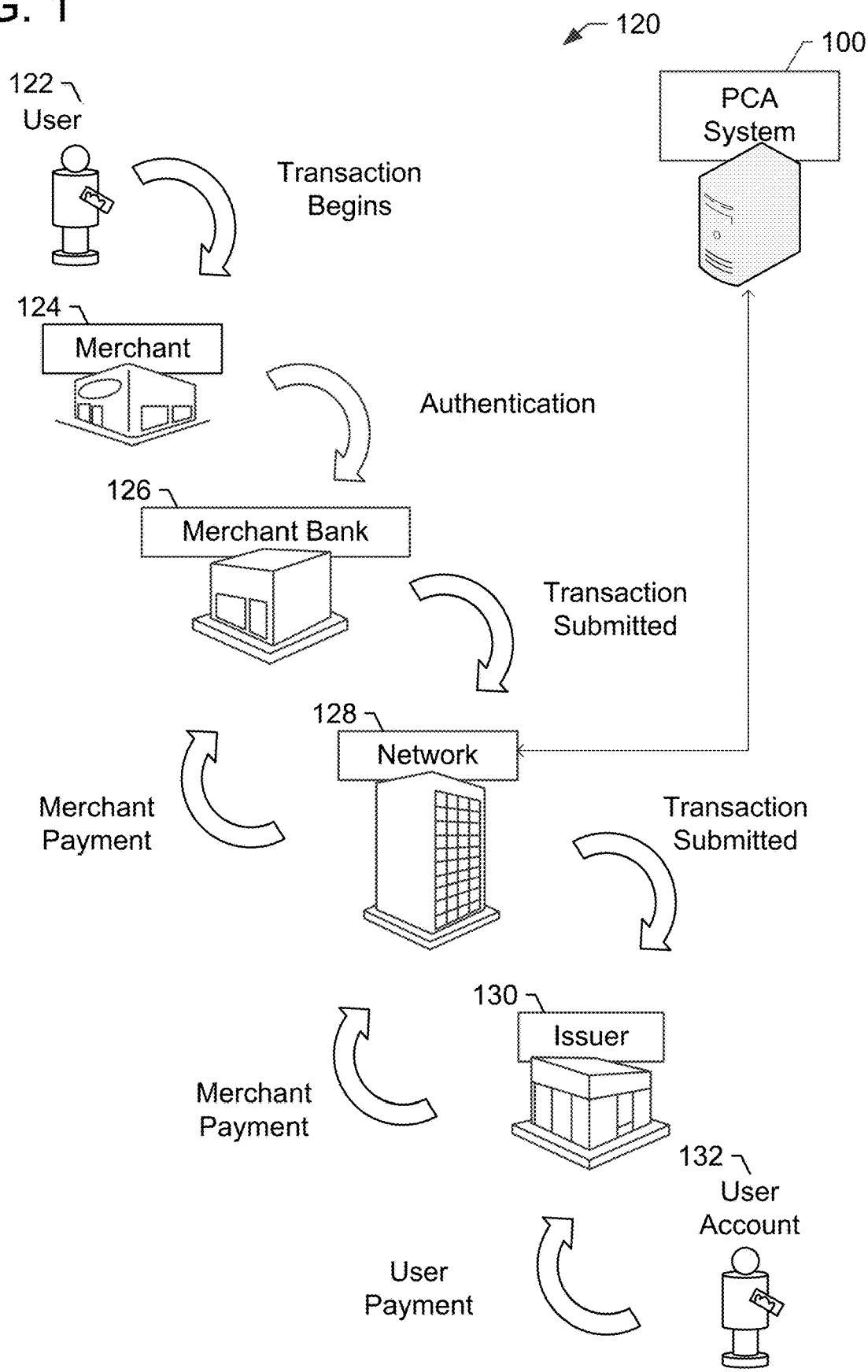
FIGS. 1-6 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure of the system and methods to enhance authentication by using a personal cloud of the user while preventing fraudulent activity.

One risk-mitigating step against fraudulent payment transactions is user authentication. For example, some payment networks engage an authentication service that performs an authentication of a suspect consumer (e.g., suspect cardholder) prior to authorization of a payment transaction. The authentication service determines if the source of the payment transaction is the authorized user of the payment card and/or payment account (e.g., actual or legitimate cardholder). During such an authentication process, the suspect consumer (e.g., the person attempting to perform the payment transaction with the merchant) may be presented with an authentication challenge, sometimes called a "step-up challenge." This step-up challenge generally requires the suspect consumer to provide a password or a passcode from a second factor device (e.g., mobile phones, Smartphones, personal digital assistants (PDAs), and/or computers) before the payment transaction will be processed. For example, the step-up challenge may be provided by an authentication service such as a 3-D Secure® protocol (3DS) (e.g., EMV® 3-D Secure by EMVCo., LLC.; Verified by Visa by Visa International Service Association, Delaware; and Mastercard SecureCode® by Mastercard International Incorporated, Purchase, N.Y.). By obtaining this additional factor from the suspect consumer, the likelihood of the suspect consumer being a fraudulent consumer is reduced. However, this extra step presents an interruptive inconvenience, a barrier, or an interference to at least some legitimate consumers and subsequently may cause at least some consumers to abandon legitimate payment transactions. These abandonments result in lost revenues to many parties, such as the merchant, the merchant acquirer, and the issuer.

In the example embodiment, a personal cloud authentication (PCA) system associated with a payment network is configured to provide enhanced authentication processes using a personal cloud of a user. More specifically, the PCA system provides a personal cloud authentication (PCA) service that provides authentication of a user enrolled in the service by leveraging the personal cloud of the user. The personal cloud of the user may include a primary user computing device and at least one secondary user computing device connected to the primary user computing device. That is, the at least one secondary user computing device is paired with the primary user computing device via Bluetooth™, Universal Serial Bus (USB), a network (e.g., network (LAN), a wide area network (WAN), or an integrated services digital network (ISDN), a dial-up-connection, a digital subscriber line (DSL), a cellular phone connection, a wireless network, a cable modem), or any other type of technology for exchanging data between computing devices.

In the example embodiment, the PCA system includes at least one personal cloud authentication (PCA) computing device. The PCA computing device includes at least one processor and at least one memory device communicatively coupled to the processor. The memory device stores computer instructions that, when executed by the processor, causes the processor to function as described herein. The PCA system also includes a database and a database server communicatively coupled to the PCA computing device. The database and the database server may be separate from each other, and in at least some embodiments, the database and the database server are in communication with the PCA computing device over different communication networks in a distributed architecture. The database and database server are configured to store data associated with payment accounts corresponding to registered users with the PCA service.

In the example embodiment, the PCA computing device may be in communication with the primary user computing device and/or the at least one secondary user computing device. The primary user computing device may be any device capable of accessing the Internet including, but not limited to, a web-based phone (e.g., a "smartphone"), a personal digital assistant (PDA), a desktop computer, a laptop computer, a cellular phone, a tablet, a phablet, or other web-based connectable equipment the user may use to enroll in the PCA service. The at least one secondary user computing device may be a similar computing device to the primary user computing device. The at least one secondary user computing device may also be a fitness wearable devices (e.g., FITBIT® brand products, JAWBONE® brand products, GARMIN® brand products, or any other fitness wearable; Fitbit is a registered trademark of Fitbit, Inc., San Francisco, Calif.; Jawbone is a registered trademark of AliphCom, San Francisco, Calif.; Garmin is registered trademark of Garmin Ltd., Camana Bay, Cayman Islands), a "smart watch", a hands-free device (e.g., Bluetooth™ device), automobile components (e.g., audio and/or navigation system, such as a Global Positioning System (GPS)) any other wearable device, or other web-connectable device capable of communicating with the primary user computing device and/or the PCA computing device.

A user may use the primary user computing device to enroll in the PCA service. When the user enrolls in the PCA service, the user may provide a user identifier (name, username, preliminary authentication, a primary account number (PAN), or another unique identifier), one or more authentication signatures (e.g., a pin, password, pattern code, digital signature, and biometric signatures), and user account information for one or more payment accounts of the user. The primary user computing device transmits to the PCA computing device the user identifier, the authentication signatures, and the user account information along with a primary user computing device identifier associated with the primary user computing device. Once the PCA computing device receives enrollment data (e.g., the user identifier, the authentication signatures, the user account information, and the primary user computing device identifier), the PCA computing device stores the enrollment data within the database as a user profile. The PCA computing device uses the user profile to build an authentication table associated with the registered user.

In some embodiments, the primary user computing device may transmit to the PCA computing device at least one secondary user computing device identifier associated with the at least one secondary user computing device. In one example, each secondary user computing device transmits a secondary user computing device identifier to the primary user computing device when the secondary user computing device and the primary user computing device are paired and/or are connected to the same network. In order to be paired, the primary user computing device and the secondary user computing device need to be near to each other. The primary user computing device may be configured to store the secondary user computing device identifier. The primary user computing device is then configured to transmit the secondary user computing device identifier to the PCA computing device. The transmission may be performed at the time of the user enrollment or at a later time, such as the time when the user is initiating a payment transaction using the primary user computing device. At the time of the transmission, the primary user computing device may or may not be paired with the secondary user computing device. Once the PCA computing device receives the secondary user computing device identifier, the PCA computing device stores the secondary user computing device identifier within the database as part of the user profile. The PCA computing device also adds the secondary user computing device identifier to the authentication table.

During a payment transaction, the registered user initiates a payment transaction with a merchant through a point of sale (POS) device or a website ecommerce gateway that is in communication with the PCA computing device. The registered user initiates the payment transaction using the primary user computing device. During the payment transaction, the primary user computing device may or may not be paired with the secondary user computing device. The primary user computing device transmits to the point of sale (POS) device or the website ecommerce gateway, a primary user computing device identifier, at least one secondary user computing device identifier, and account data related to the payment card used to perform the transaction (e.g., PAN associated with payment card, card expiration date, card issuer, card security code, or the like). The merchant provides to the PCA computing device transaction data associated with the payment transaction. The transaction data may include, among other data, data associated with the registered user and the merchant involved in the payment transaction. For example, transaction data may include a transaction amount, a transaction date, the account data, a merchant identifier, stock-keeping unit (SKU) data relating to the goods or services purchased from the consumer, an authentication request, the primary user computing device identifier, and the at least one secondary user computing device identifier.

In the example embodiment, the PCA computing device is configured to receive and/or collect the transaction data and store the transaction data within a database. The PCA computing device is also configured to parse the transaction data, extract the primary user computing device identifier and the at least one secondary user computing device identifier (e.g., an input secondary computing device identifier), match the at least one secondary user computing device identifier to the at least one secondary user computing device identifier stored in the authentication table, and generate an authentication response based on the match. If the at least one secondary user computing device identifier match the at least one secondary user computing device identifier stored, the PCA computing device includes an approved message in the authentication response, otherwise the PCA computing device includes a decline message in the authentication response. The PCA computing device may also update the authentication table every time the transaction data associated with a stored user profile is received. That is, the PCA computing device may add and/or remove one or more secondary user computing devices identifiers, the primary user computing device identifier, and/or other data that may be included in the authentication table.

In the example embodiment, if the PCA computing device is unable to authenticate a suspect cardholder involved in the transaction based on a matching of the secondary computing device identifier, then the PCA computing device may be configured to transmit an authentication challenge (e.g., in the form of at least one question and/or at least a request for an authentication code) to the primary computing device to otherwise authenticate the suspect cardholder as the actual cardholder. In another embodiment, the PCA computing device includes a risk-based decisioning (RBD) component or is in communication with a RBD component that evaluates the payment transaction being initiated and generates a risk score for the transaction indicating how likely the transaction is fraudulent. In one embodiment, the risk score is based, at least in part, on whether there is a matching of the secondary computing device identifiers. In some cases, the RBD component may score the transaction as a low fraud risk (e.g., when the input secondary computing device identifier(s) match the stored secondary computing device identifier(s), etc.), and thus, may approve the transaction without any further authentication steps. However, in other cases, the RBD component may score the transaction as a high fraud risk, and thus, may initiate the authentication challenge process where at least one question is directed to the suspect cardholder to further authenticate.

For example, an authentication challenge may be provided by an authentication service such as a 3-D Secure® protocol (3DS) (e.g., EMV® 3-D Secure by EMVCo., LLC.;

Verified by Visa by Visa International Service Association, Delaware; and Mastercard SecureCode® by Mastercard International Incorporated, Purchase, N.Y.). This extra step of presenting a challenge question to the suspect cardholder is to help confirm that they are the legitimate cardholder associated with the account and account number presented. The PCA computing device receives input from the primary computing device (e.g., a user providing the account identifier/number associated with the payment account) in response to the challenge. Based on the challenge response, the PCA computing device determines whether the user is associated with the cardholder account and transmits an authentication response based on the determination to the merchant/issuer.

Additionally or alternatively, the PCA computing device may also utilize the RBD component to determine whether the step-up challenge is needed. In other words, authentication may be performed in some cases without the stepped-up challenge. For example, the RBD component may identify one or more pieces of information about the transaction that are used to "score" the transaction for risk (e.g., potential fraud). More specifically, the RBD component may score the transaction based on several aspects including device information, account information, and whether the input secondary computing device identifiers match the stored secondary computing device identifiers. Device information may include information about the computing device used during the transaction, such as a unique hardware identifier, or an IP address associated with the device, etc. Account information may include information about the account being used, such as dates of use, name on the account or address associated with the account, etc. In one embodiment, the RBD component generates a risk score for the transaction based on the device information, account information and/or matching information used for the transaction. The RBD component may then send the score and/or risk-based decisioning data to an issuer's ACS (access control system) for further consideration. Using this score and/or risk-based data, the issuer's ACS may then determine whether or not the suspect consumer should be further authenticated (e.g., through the 3DS "step-up" challenge) or whether the transaction can be verified without further challenges.

The methods and system described herein may be implemented using computer programming or engineering techniques including computer software, firmware, hardware, or any combination or subset. As disclosed above, at least one technical problem with prior systems is that there is a need for an enhanced payment transaction authorization process. The system and methods described herein address that technical problem. The technical effect of the systems and processes described herein is achieved by performing at least one of the following steps: (a) building an authentication table using a user profile, wherein the user profile includes a user identifier, authentication signatures, user account information, and a first primary user computing device identifier, and a first secondary user computing device identifier; (b) receiving transaction data associated with the user account information; (c) storing the transaction data within a database, wherein the transaction data includes at least an authentication request, a second primary user computing device identifier and a second secondary user computing device identifier; (d) parsing the transaction data; (e) extracting the second primary user computing device identifier and the second secondary user computing device identifier from the transaction data; (f) matching the first primary user computing device identifier to the second primary user computing device identifier and the first secondary user computing device identifier to the second secondary user computing device identifier; (g) generating, in response to the authentication request, an authentication response based on the matching; and (h) transmitting the authentication response to a merchant.

The resulting technical effect is that a more accurate and effective authentication system provides a method of using at least one secondary user computing device identifier to determine a user is the authorized user of a payment account.

The resulting technical benefits achieved by this system include at least one of: (i) improving the overall efficiency of the payment network by reducing the number of data requiring authentication; (ii) reducing the number of denials for valid payment transactions; (iii) improving fraud detection; (iv) improving the ability to authenticate a user with the capabilities of the devices available; and (v) increasing user buy-in with authentication of the user computing devices to reduce user annoyance.

As will be appreciated, based on the description herein, the technical improvement in payment network systems as described is a computer-based solution to a technical deficiency or problem that is itself rooted in computer technology (i.e., the problem itself derives from the use of computer technology). More specifically, the technical problems and inefficiencies created by the conventional authentication and authorization systems and related methods in a payment network (e.g., inefficient network operation, an undesirable number of denials of valid transactions, inefficient fraud detection and prevention, etc.) are the result of an implementation and use of computers in those authorization and authentication systems and methods. The present invention improves upon the conventional methods and systems in the manners described herein. Thus, the inefficiencies or technical problems created by the authentication and authorization systems and related methods as described herein are solved (i.e., the desired outcome of achieving increased network efficiency, a decreased number of denials of valid transactions, increased fraud detection and prevention, etc. are achieved) by the methods and systems described and particularly claimed herein.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a payment transaction.

As described herein, the payment network may be configured to process authorization messages, such as ISO 8583 compliant messages and ISO 20022 compliant messages. As used herein, ISO® refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example personal cloud authentication (PCA) system 100 in communication with a multi-party payment processing system 120 (also referred to as payment network 120). Embodiments described herein may relate to a payment transaction account and/or payment transaction card system, such as a credit card payment system using the Mastercard® interchange network. The Mastercard interchange network is a set of proprietary communications standards promulgated by Mastercard International Incorporated® for the exchange of financial transaction data and the settlement of funds between financial institutions that are registered with Mastercard International Incorporated. (Mastercard is a registered trademark of Mastercard International Incorporated located in Purchase, N.Y.).

In the payment card processing system, a financial institution called the "issuer" issues a payment account, payment transaction card, and/or electronic payments account identifier, such as a credit card, to a consumer or user 122, who uses the payment transaction card to tender payment for a purchase from a merchant 124. To accept payment with the payment transaction card, merchant 124 must normally establish an account with a financial institution that is part of the financial payment system. This financial institution is usually called the "merchant bank," the "acquiring bank," or the "acquirer." When user 122 tenders payment for a purchase with a payment transaction card, merchant 124 requests authorization from a merchant bank 126 for the amount of the purchase. The request may be performed over the telephone, but is usually performed through the use of a point-of-sale terminal, which reads user's 122 account information from a magnetic stripe, a chip, or embossed characters on the payment transaction card and communicates electronically with the payment transaction processing computers of merchant bank 126. Alternatively, merchant bank 126 may authorize a third party to perform payment transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether user account 132 is in good standing and whether the purchase is covered by user's 122 available credit line. User account 132 is associated with user 122. Based on these determinations, the request for authorization will be declined or accepted. If the request is accepted, an authorization code is issued to merchant 124.

When a request for authorization is accepted, the available credit line of user account 132 is decreased. Normally, a charge for a payment transaction is not posted immediately to user account 132 because bankcard associations, such as Mastercard International Incorporated, have promulgated rules that do not allow merchant 124 to charge, or "capture," a payment transaction until goods are shipped or services are delivered. However, with respect to at least some debit card payment transactions, a charge may be posted at the time of the payment transaction. When merchant 124 ships or delivers the goods or services, merchant 124 captures the payment transaction by, for example, appropriate data entry procedures on the point-of-sale terminal. This may include bundling of approved payment transactions daily for standard retail purchases. If user 122 cancels a payment transaction before it is captured, a "void" is generated. If user 122 returns goods after the payment transaction has been captured, a "credit" is generated. Interchange network 128 and/or issuer bank 130 stores the payment transaction information, such as a category of merchant, a merchant identifier, a location where the payment transaction was completed, amount of purchase, date and time of payment transaction, in a database 220 (shown in FIG. 2). PCA system 100 may also store the payment transaction information in one or more databases, such as database 220 and/or database server 216 (shown in FIG. 2).

After a purchase has been made, a clearing process occurs to transfer additional transaction data related to the purchase among the parties to the payment transaction, such as merchant bank 126, interchange network 128, and issuer bank 130. More specifically, during and/or after the clearing process, additional data, such as a time of purchase, a merchant name, a type of merchant, purchase information, user account information, a type of payment transaction, itinerary information, information regarding the purchased item and/or service, and/or other suitable information, is associated with a payment transaction and transmitted between parties to the payment transaction as transaction data, and may be stored by any of the parties to the payment transaction. In the example embodiment, when user 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card payment transactions, when a request for a personal identification number (PIN) authorization is approved by the issuer, user account 132 is decreased. Normally, a charge is posted immediately to user account 132. The payment card association then transmits the approval to the acquiring processor for distribution of goods/services or information, or cash in the case of an automated teller machine (ATM).

After a payment transaction is authorized and cleared, the payment transaction is settled among merchant 124, merchant bank 126, and issuer bank 130. Settlement refers to the transfer of financial data or funds among merchant's 124 account, merchant bank 126, and issuer bank 130 related to the payment transaction. Usually, payment transactions are captured and accumulated into a "batch," which is settled as a group. More specifically, a payment transaction is typically settled between issuer bank 130 and interchange network 128, and then between interchange network 128 and merchant bank 126, and then between merchant bank 126 and merchant 124.

In some embodiments, user 122 registers one or more payment cards with a digital wallet. Having done this, user 122 can interact with a participating online merchant 124. At the check-out stage, online merchant 124 displays a button on the merchant website which user 122 can click on in order to make a payment using the user's digital wallet. Online merchant 124 then redirects the user to a "switch" operated by interchange network 128. Using a cookie located on the user's computer, the "switch" is able to determine which wallet-hosting server hosts a wallet associated with user 122. The switch then establishes a connection between the user's computer and the appropriate wallet-hosting system, which presents user 122 with a sign-in page (e.g., as a pop-up window), where there is an authentication process (e.g., entry of a pre-agreed password). This log-in process may use the same login credentials (e.g., password) which the user also uses to obtain access to other online banking activities.

The wallet-hosting system then securely transfers the user's payment information to the online merchant's domain. The merchant's domain submits the user's payment information to merchant bank 126 for a separate authorization process in which the acquiring domain communicates with the issuer bank 130 to ask the bank to authorize the payment transaction. Thus, user 122 is not required to enter their card details (except at the stage of initially registering with the wallet-hosting system), and the online payment transaction process is streamlined with only a single redirection, and consistent branding for the entire payment process, irrespective of the online merchant 124.

In the example embodiment, user 122 provides user account data, such as a biometric sample or other type of user identifier (e.g., username and password). During authorization, one or more parties to the payment transaction, such as interchange network 128, may communicate with a personal cloud authorization (PCA) system 100 that is configured to authenticate user 122 using a personal cloud associated with user 122. In the example embodiment, PCA system 100 authenticates user 122 by building an authentication table based upon a user profile and matching at least one secondary user computing device in the authentication table to at least one secondary user computing device included in transaction data associated with payment transactions initiated by user 122. During operation, interchange network 128 may transmit transaction data to PCA system 100, and PCA system may transmit one or more authentication responses to interchange network 128 that may include an authentication approval or denial of user 122.

In some embodiments, a unique identifier is provided to user 122. The unique identifier is different from the user's account number. In these embodiments, interchange network 128 stores the unique identifier in database 220 along with user account 132. When interchange network 128 receives the unique identifier, interchange network 128 determines the associated user account 132 and uses that information in processing the payment transaction.

Figure 2:
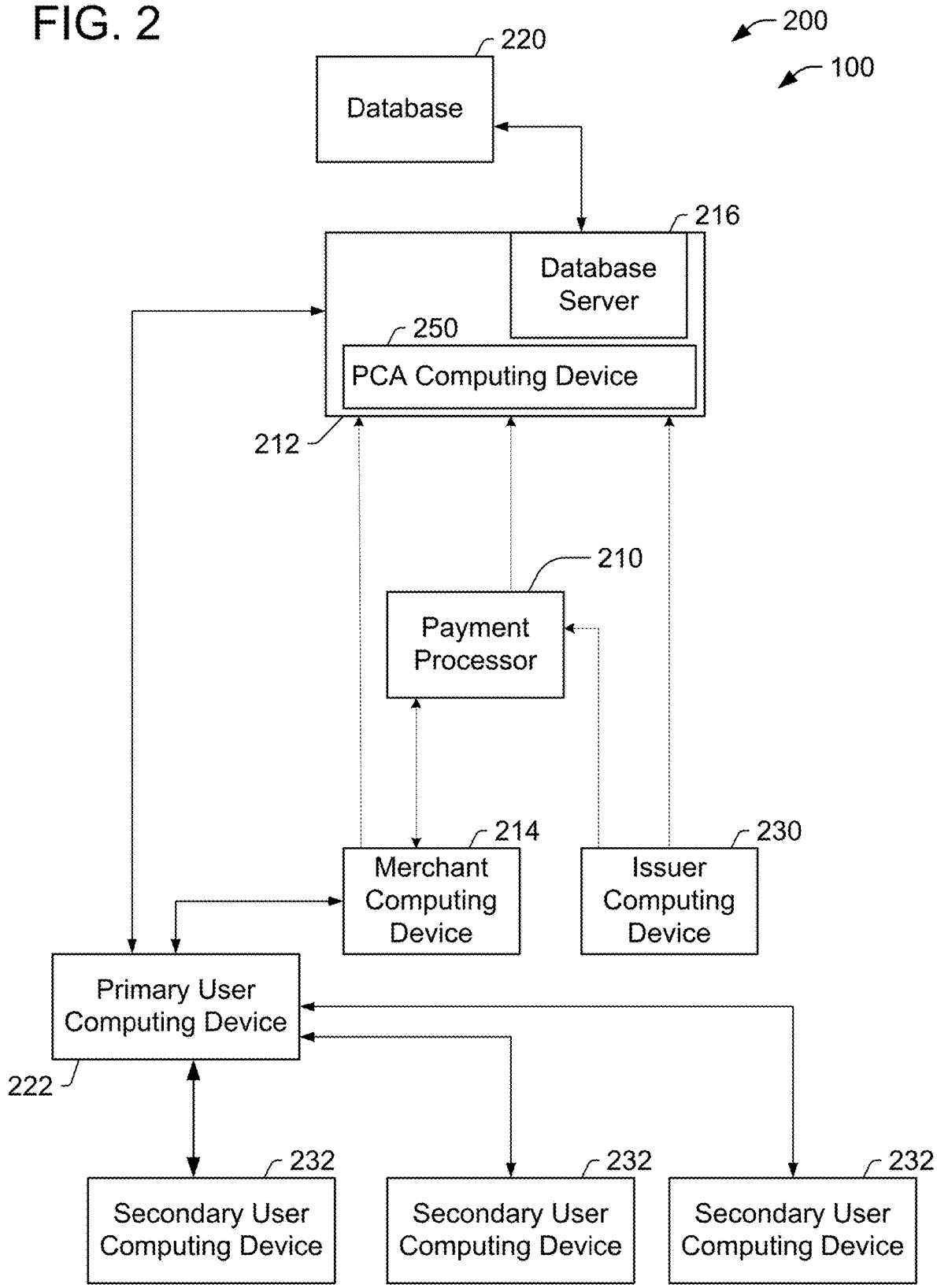

FIG. 2 is a simplified block diagram of an example personal cloud authentication (PCA) system 200, similar to PCA system 100 (shown in FIG. 1), in which a variety of computing devices are communicatively coupled to each other via a plurality of network connections. More specifically, the variety of computing devices is communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, a wireless network, a cable modem, or other connections capable of transmitting data across computing devices. PCA system 200 includes at least one personal cloud authentication (PCA) computing device 250 and database server 216, which may be components of server system 212. Server system 212 may be a server, a network of multiple computer devices, a virtual computing device, or the like. PCA computing device 250 may be connected to merchant computing device 224 associated with merchant 124 (shown in FIG. 1), primary user computing device 222 associated with user 122 (shown in FIG. 1), secondary user computing device 232 paired and/or sharing the same network with primary user computing device 222, and issuer computing device 230 associated with issuer bank 130 (shown in FIG. 1) via at least a payment processor 210 of the interchange network 128 (shown in FIG. 1). PCA computing device 250 may be directly communicatively coupled to merchant computing device 224, primary user computing device 222, secondary user computing device 232, issuer computing device 230, payment processor 210, database server 216, and database 220 through one or more communication networks or communication channels.

A database server 216 is communicatively coupled to a database 220 that stores data. In one embodiment, database 220 includes at least one user profile, transaction data, and at least one authentication table. In the example embodiment, database 220 is stored remotely from PCA computing device 250. In some embodiments, database 220 is decentralized. In the example embodiment, a person can access database 220 via primary user computing device 222 by logging onto PCA computing device 250, as described herein.

PCA computing device 250 is communicatively coupled with payment processor 210. Payment processor 210 represents one or more parts of payment network 120 (shown in FIG. 1). In the example embodiment, PCA computing device 250 is in communication with one or more computing devices associated with interchange network 128. In other embodiments, PCA computing device 250 is in communication with one or more computing devices associated with merchant 124, merchant bank 126 (shown in FIG. 1), or issuer bank 130. In some embodiments, PCA computing device 250 may be associated with, or is part of payment network 120, or in communication with payment network 120. In other embodiments, PCA computing device 250 is associated with a third party and is in communication with payment network 120. In some embodiments, PCA computing device 250 may be associated with, or be part of merchant bank 126, interchange network 128, and issuer bank 130. In addition, PCA computing device 250 is communicatively coupled with merchant 124. In the example embodiment, PCA computing device 250 is in communication with merchant 124, primary user computing device 222, and secondary user computing device 232 via Application Programming Interface (API) calls. Through the API call, merchant 124, primary user computing device 222, and secondary user computing device 232 may transmit information to and receive information from PCA computing device 250.

In the example embodiment, PCA system 200 provides a personal cloud authentication (PCA) service that provides authentication of a user enrolled in the service by leveraging the personal cloud of the user. The personal cloud of the user may include primary user computing device 222 and at least one secondary user computing device 232 connected to primary user computing device 222. Primary user computing device 222 may be any device capable of accessing the Internet including, but not limited to, a web-based phone (e.g., a "smartphone"), a personal digital assistant (PDA), a desktop computer, a laptop computer, a cellular phone, a tablet, a phablet, or other web-based connectable equipment the user may use to enroll in the PCA service. Secondary user computing device 232 may be a similar computing device to primary user computing device 222. Secondary user computing device 232 may also be a fitness wearable devices (e.g., FITBIT® brand products, JAWBONE® brand products, GARMIN® brand products, or any other fitness wearable; Fitbit is a registered trademark of Fitbit, Inc., San Francisco, Calif.; Jawbone is a registered trademark of AliphCom, San Francisco, Calif.; Garmin is registered trademark of Garmin Ltd., Camana Bay, Cayman Islands), a "smart watch", a hands-free device (e.g., Bluetooth™ device), automobile components (e.g., audio and/or navigation system, such as a Global Positioning System (GPS) any other wearable device, or other web-connectable device capable of communicating with primary user computing device 222 and/or PCA computing device 250. Primary user computing device 222 and secondary user computing device 232 are computing devices that include a web browser or a software application to enable primary user computing device 222 and secondary user computing device 232 to communicate with PCA computing device 250 and/or merchant computing device 214 using a network, such as the Internet.

When user 122 enrolls in the PCA service, user 122 may provide a user identifier (name, username, preliminary authentication, a primary account number (PAN), or another unique identifier), one or more authentication signatures (e.g., a pin, password, pattern code, digital signature, and biometric signatures), and user account information for one or more payment accounts of user 122. Primary user computing device 222 transmits to PCA computing device 250 the user identifier, the authentication signatures, and the user account information along with a primary user computing device identifier associated with primary user computing device 222. Once PCA computing device 250 receives enrollment data (e.g., the user identifier, the authentication signatures, the user account information, and the primary user computing device identifier), PCA computing device 250 stores the enrollment data within database server 216 or database 220 as a user profile. PCA computing device 250 uses the user profile to build an authentication table associated with registered user 122.

In some embodiments, primary user computing device 222 may transmit to PCA computing device 250 at least one secondary user computing device identifier associated with at least one secondary user computing device 232. In one example, each secondary user computing device 232 transmits a secondary user computing device identifier to primary user computing device 222, which transmits the secondary user computing device identifier to PCA computing device 250. The transmission may be performed at the time of user 122 enrollment or at a later time, such as the time when user 122 is initiating a payment transaction using primary user computing device 222. Once PCA computing device 250 receives the secondary user computing device identifier, PCA computing device 250 stores the secondary user computing device identifier within database server 216 or database 220 as part of user 122 profile. PCA computing device 250 also adds the secondary user computing device identifier to the authentication table.

During a payment transaction, registered user 122 initiates a payment transaction with merchant 124 through merchant computing device 214, which may be a point of sale (POS) device or a website ecommerce gateway that is in communication with PCA computing device 250. Merchant 124 provides to PCA computing device 250 transaction data associated with the payment transaction. The transaction data may include, among other data, data associated with registered user 122 and merchant 124 involved in the payment transaction. For example, transaction data may include a transaction amount, a transaction date, account data related to the payment card and/or payment account used to perform the payment transaction (e.g., PAN associated with payment card, card expiration date, card issuer, card security code, or the like), a merchant identifier, stock-keeping unit (SKU) data relating to the goods or services purchased from the consumer, an authentication request, a primary user computing device identifier, and at least one secondary user computing device identifier.

In the example embodiment, PCA computing device 250 is configured to receive and/or collect the transaction data and store the transaction data within database server 216 or database 220. PCA computing device 250 is also configured to parse the transaction data, extract the primary user computing device identifier and the at least one secondary user computing device identifier, match the at least one secondary user computing device identifier to the at least one secondary user computing device identifier stored in the authentication table, and generate an authentication response based on the match. If the at least one secondary user computing device identifier match the at least one secondary user computing device identifier stored, PCA computing device 250 includes an approved message in the authentication, otherwise PCA computing device 250 includes a decline message in the authentication response. PCA computing device 250 may also update the authentication table every time the transaction data associated with a stored user profile is received. That is, PCA computing device 250 may add and/or remove one or more secondary user computing devices identifiers, the primary user computing device identifier, and/or other data that may be included in the authentication table.

In some embodiments, PCA computing device 250 may be associated with the financial interchange network 128 and may be referred to as an interchange computer system. PCA computing device 250 may be used for processing transaction data and analyzing for fraudulent payment transactions. In addition, PCA computing device 250 may generate authentication data. PCA computing device 250 generates the authentication data by computing the number of successful authentications and/or unsuccessful authentications of user 122. PCA computing device 250 may compute this number by adding the number of times that secondary user computing device identifiers included in the transaction data matched or did not match to the stored secondary user computing device identifiers. PCA computing device 250 may be configured to transmit to issuer bank 130 the number of successful authentications and/or unsuccessful authentications of user 122. Issuer bank 130 may use this number to calculate a risk score associated with user account 132 (shown in FIG. 1). PCA computing device 250 is also configured to calculate the risk score by using a risk-based decisioning (RBD) service. PCA computing device 250 uses the RBD service to evaluate the transaction data and identify one or more pieces of information about the payment transaction that are used to "score" the payment transaction for risk (e.g., potential fraud).

In the example embodiment, if PCA computing device 250 is unable to authenticate a suspect cardholder involved in the transaction based on a matching of the secondary computing device identifiers, then PCA computing device 250 may be configured to transmit an authentication challenge (e.g., in the form of at least one question and/or at least a request for an authentication code) to the primary computing device to otherwise authenticate the suspect cardholder as the actual cardholder. In another embodiment, PCA computing device 250 includes a risk-based decisioning (RBD) component or is in communication with a RBD component that evaluates the payment transaction being initiated and generates a risk score for the transaction indicating how likely the transaction is fraudulent. In one embodiment, the risk score is based, at least in part, on whether there is a matching of the secondary computing device identifiers. In some cases, the RBD component may score the transaction as a low fraud risk (e.g., when the input secondary computing device identifier(s) match the stored secondary computing device identifier(s), etc.), and thus, may approve the transaction without any further authentication steps. However, in other cases, the RBD component may score the transaction as a high fraud risk, and thus, may initiate the authentication challenge process where at least one question is directed to the suspect cardholder to further authenticate.

For example, an authentication challenge may be provided by an authentication service such as a 3-D Secure® protocol (3DS) (e.g., EMV® 3-D Secure by EMVCo., LLC.; Verified by Visa by Visa International Service Association, Delaware; and Mastercard SecureCode® by Mastercard International Incorporated, Purchase, N.Y.). This extra step of presenting a challenge question to the suspect cardholder is to help confirm that they are the legitimate cardholder associated with the account and account number presented. PCA computing device 250 receives input from the primary computing device (e.g., a user providing the account identifier/number associated with the payment account) in response to the challenge. Based on the challenge response, PCA computing device 250 determines whether the user is associated with the cardholder account and transmits an authentication response based on the determination to the merchant/issuer.

Additionally or alternatively, PCA computing device 250 may also utilize the RBD component to determine whether the step-up challenge is needed. In other words, authentication may be performed in some cases without the stepped-up challenge. For example, the RBD component may identify one or more pieces of information about the transaction that are used to "score" the transaction for risk (e.g., potential fraud). More specifically, the RBD component may score the transaction based on several aspects including device information, account information, and whether the input secondary computing device identifiers match the stored secondary computing device identifiers. Device information may include information about the computing device used during the transaction, such as a unique hardware identifier, or an IP address associated with the device, etc. Account information may include information about the account being used, such as dates of use, name on the account or address associated with the account, etc. In one embodiment, the RBD component generates a risk score for the transaction based on the device information, account information and/or matching information used for the transaction. The RBD component may then send the score and/or risk-based decisioning data to an issuer's ACS (access control system) for further consideration. Using this score and/or risk-based data, the issuer's ACS may then determine whether or not the suspect consumer should be further authenticated (e.g., through the 3DS "step-up" challenge) or whether the transaction can be verified without further challenges.

Figure 3:
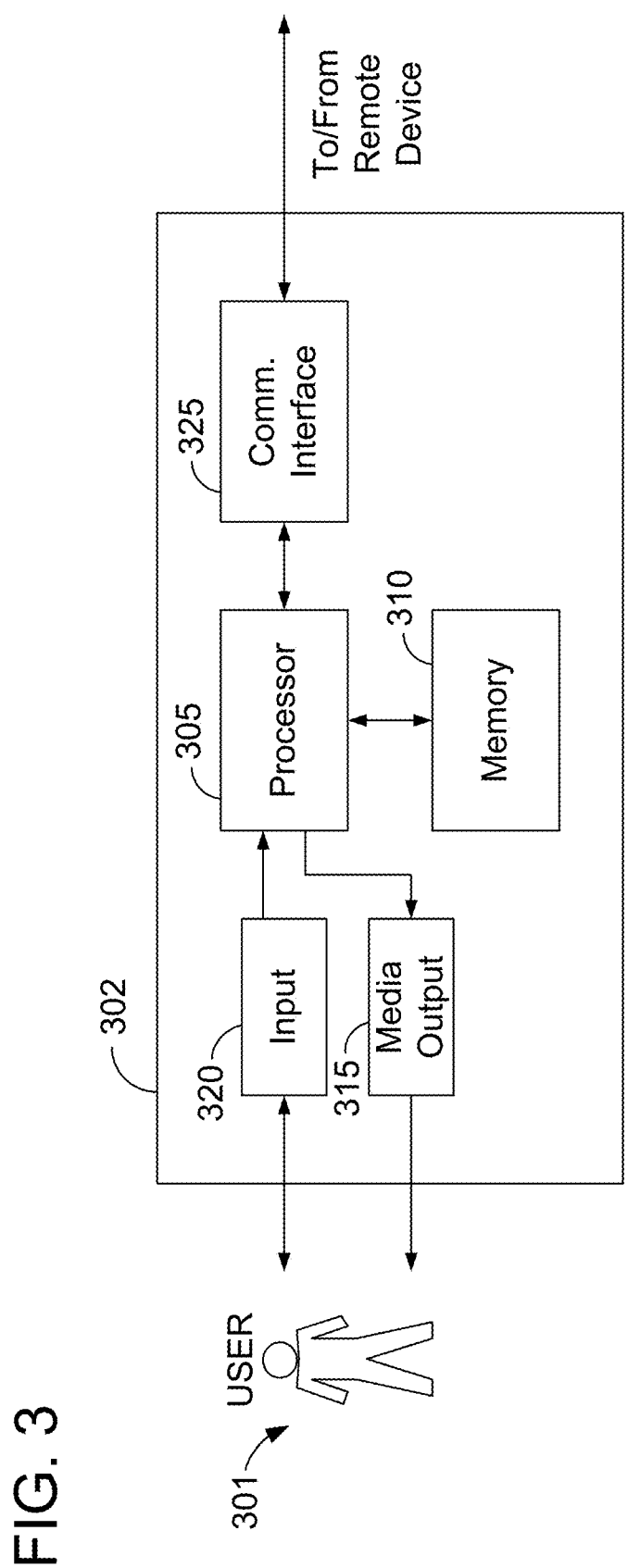

FIG. 3 illustrates an example configuration of a user computing device 302, such as primary user computing device 222 and secondary user computing device 232 shown in FIG. 2, in accordance with one embodiment of the present disclosure. User computing device 302 is operated by a user 301, similar to user 122 shown in FIG. 1. User computing device 302 may include, but is not limited to, primary user computing device 222, secondary user computing device 232, computing devices associated with merchant 124 and computing devices associated with user 122 (both shown in FIG. 1). User computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computing device 302 also includes at least one media output component 315 for presenting information to user 301. Media output component 315 is any component capable of conveying information to user 301. In some embodiments, media output component 315 includes an output adapter (not shown), such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computing device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computing device 302 may also include a communication interface 325, communicatively coupled to a remote device, such as PCA computing device 250 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from PCA computing device 250. A client application allows user 301 to interact with, for example, PCA computing device 250. For example, instructions may be stored by a cloud service and the output of the execution of the instructions sent to the media output component 315.

Figure 4:
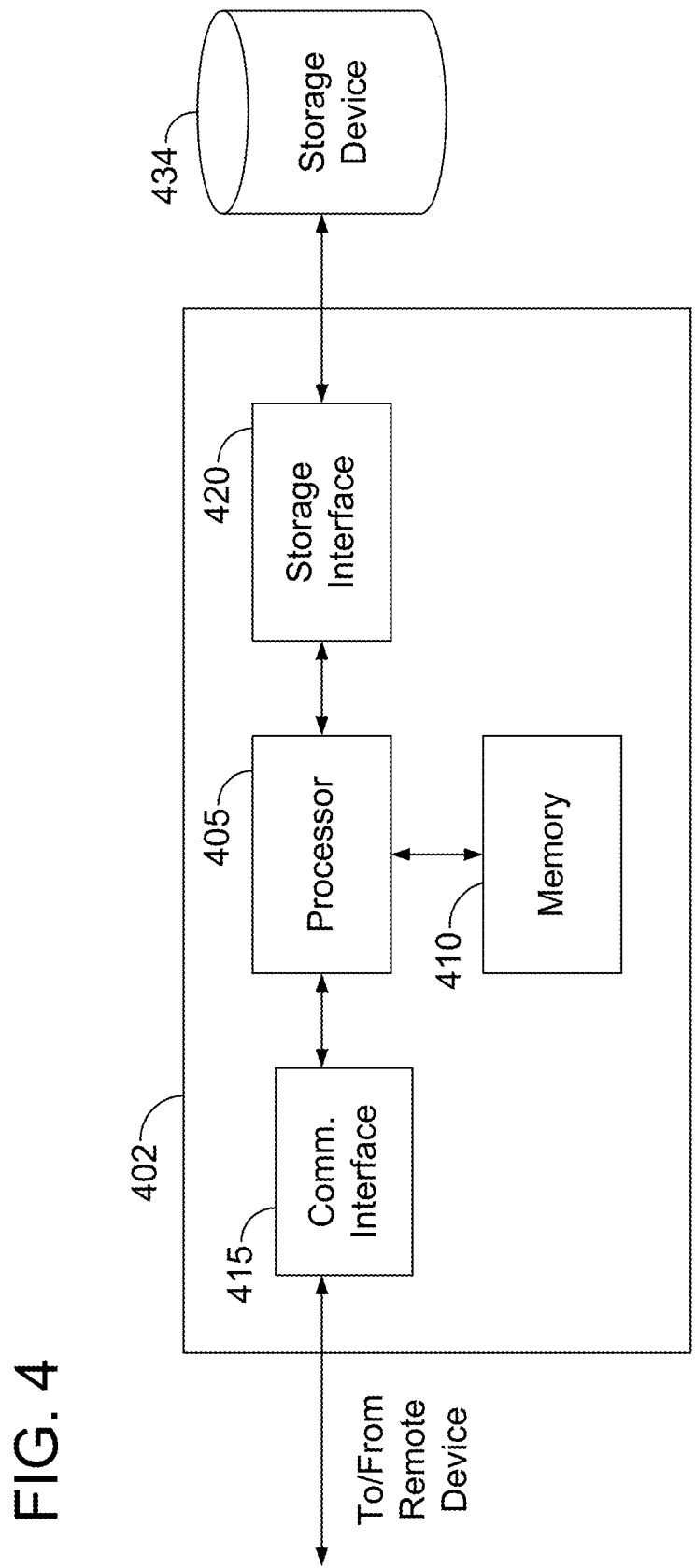

FIG. 4 illustrates an example configuration of a server system 212 shown in FIG. 2, in accordance with one embodiment of the present disclosure. Server computing device 402 may include, but is not limited to, database server 216, merchant computing device 214 (e.g., merchant/website server), and PCA computing device 250 (all shown in FIG. 2). Server computing device 402 also includes a processor 405 for executing instructions. Instructions may be stored in a memory 410. Processor 405 may include one or more processing units (e.g., in a multi-core configuration).

Processor 405 is operatively coupled to a communication interface 415 such that server computing device 402 is capable of communicating with a remote device, such as another server computing device 402, merchant computing device 214, or PCA computing device 250 (all shown in FIG. 2). For example, communication interface 415 may receive requests from merchant computing device 214 (shown in FIG. 2), primary user computing device 222 (shown in FIG. 2), secondary user computing device 232 (shown in FIG. 2), and/or issuer computing device 230 (shown in FIG. 2) via network, such as the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computing device 402. For example, server computing device 402 may include one or more hard disk drives as storage device 434. In other embodiments, storage device 434 is external to server computing device 402 and may be accessed by a plurality of server computing devices 402. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
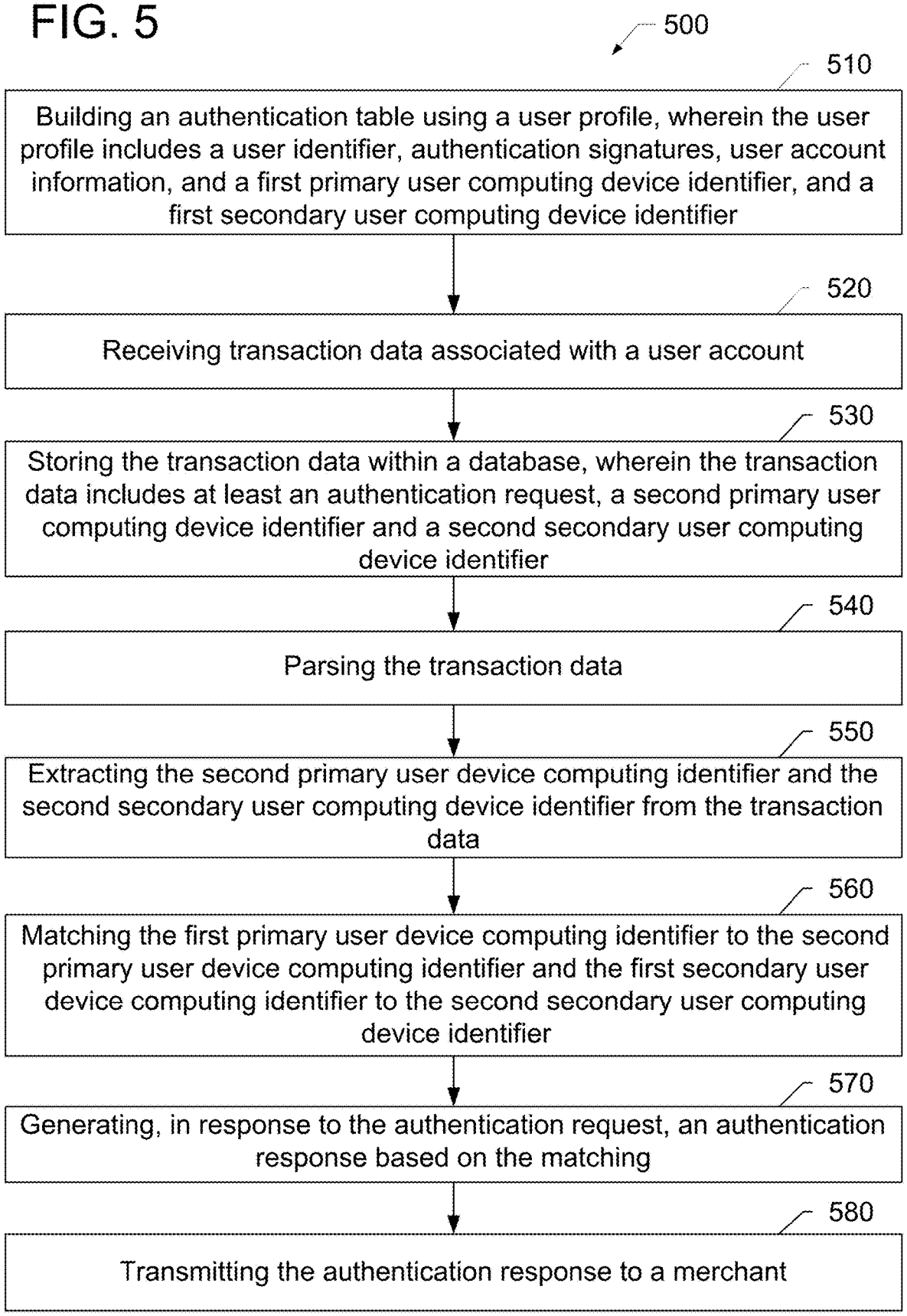

FIG. 5 is an example flow diagram illustrating a method flow 500 for authenticating an online user, such as user 122 (shown in FIG. 1) using device data stored on a personal cloud platform of user 122. In the example embodiment, method 500 is performed by PCA system 200 (shown in FIG. 2). Method 500 includes building 510 an authentication table using a user profile that includes a user identifier, authentication signatures, user account information, and a first primary user computing device identifier, and a first secondary user computing device identifier. Method 500 also includes receiving 520 transaction data associated with the user account information and storing 530 the transaction data within a database, wherein the transaction data includes at least an authentication request, a second primary user computing device identifier and a second secondary user computing device identifier. Method 500 further includes parsing 540 the transaction data, extracting 550 the second primary user computing device identifier and the second secondary user computing device identifier from the transaction data, and matching 560 the first primary user computing device identifier to the second primary user computing device identifier and the first secondary user computing device identifier to the second secondary user computing device identifier. Method 500 also includes generating 570, in response to the authentication request, an authentication response based on the matching and transmitting 580 the authentication response to a merchant.

Figure 6:
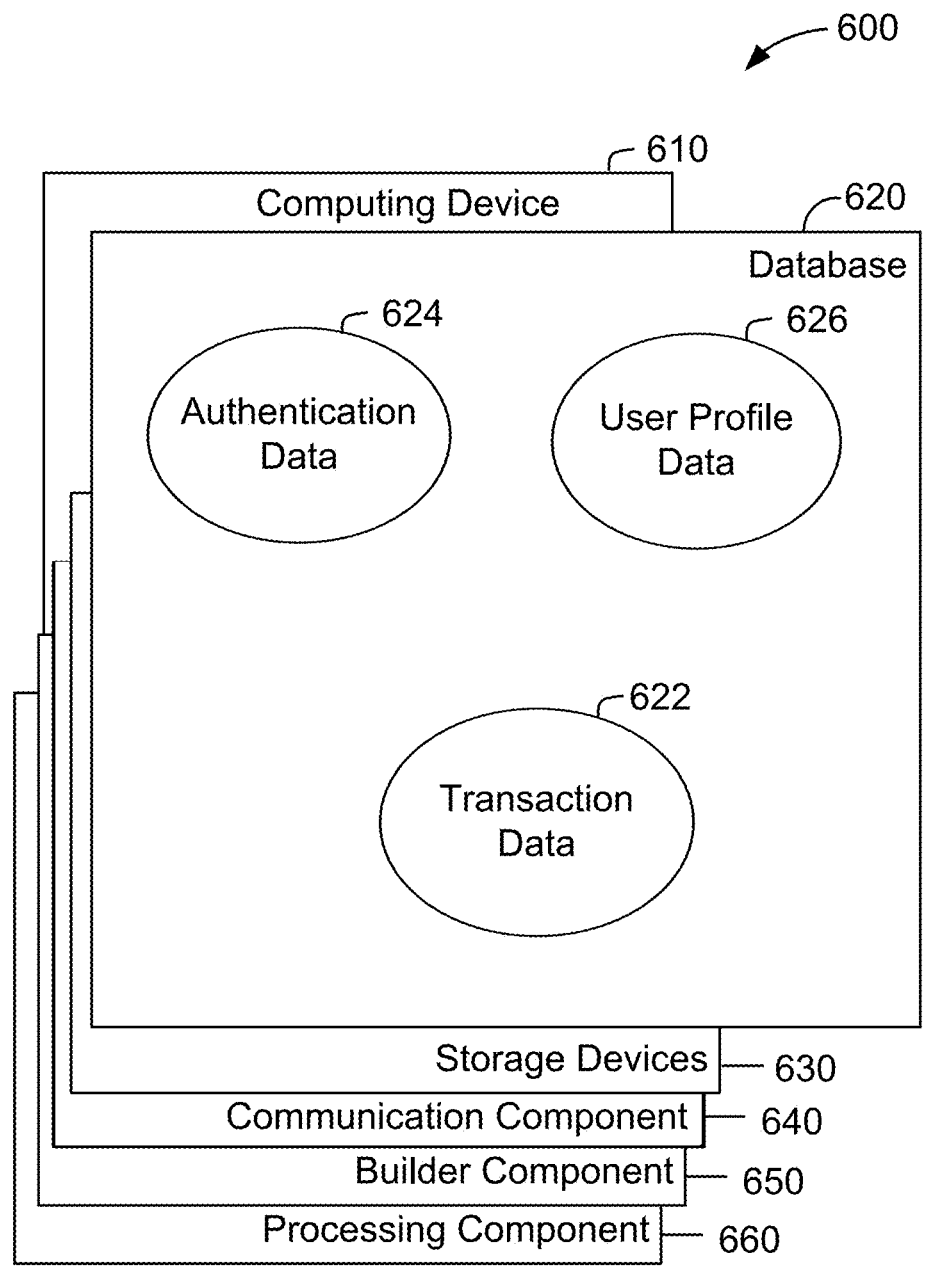

FIG. 6 is a diagram 600 of components of one or more example computing devices that may be used in PCA system 200 shown in FIG. 2. In some embodiments, computing device 610 is similar to PCA computing device 250 (shown in FIG. 2). Database 620 may be coupled with several separate components within computing device 610, which perform specific tasks. In this embodiment, database 620 includes transaction data 622, authentication data 624, and user profile data 626. In some embodiments, database 620 is similar to database 220 (shown in FIG. 2).

Computing device 610 includes database 620, as well as data storage devices 630 for storing 530 (shown in FIG. 5) transaction data within a database, such as database 620. Computing device 610 also includes a communication component 640 for receiving 520 transaction data and transmitting 580 one or more authentication responses (both shown in FIG. 5). Computing device 610 also includes a builder component 650 for building 510 an authentication table (shown in FIG. 5), processing component 660 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A personal cloud authentication (PCA) system comprising one or more personal cloud authentication (PCA) computing devices for authenticating an online user via a personal cloud authentication (PCA) service using device data stored on a personal cloud platform of the online user, the one or more PCA computing devices comprising a processor communicatively coupled to a memory device, the processor configured to:

store, within a database, enrollment data as a user profile associated with the online user, the enrollment data including a first primary user computing device identifier associated with a primary user computing device and a first secondary user computing device identifier associated with a secondary user computing device;

build, within the database, an authentication table using the user profile, wherein the user profile includes a user identifier, authentication signatures, user account information, the first primary user computing device identifier, and the first secondary user computing device identifier;

receive, from a merchant, transaction data associated with the user account information, the transaction data corresponding to a payment transaction;

store the transaction data within the database, wherein the transaction data includes at least an authentication request, a second primary user computing device identifier and a second secondary user computing device identifier, the second secondary user computing device identifier indicative of a pairing between a candidate secondary user computing device and a candidate primary user computing device identified by the second primary user computing device identifier;

parse the transaction data;

extract the second primary user computing device identifier and the second secondary user computing device identifier from the transaction data;

compare the first primary user computing device identifier stored in the user profile to the extracted second primary user computing device identifier, and the first secondary user computing device identifier stored in the user profile to the extracted second secondary user computing device identifier;

determine whether an authentication challenge is required to verify the online user based on the comparison, wherein:

a) in response to i) the candidate primary user computing device matching the primary user computing device stored in the user profile and ii) the candidate secondary user computing device matching the secondary user computing device stored in the user profile, determining that the authentication challenge is not required and the online user is verified; and b) in response to i) the candidate primary user computing device matching the primary user computing device stored in the user profile and ii) the candidate secondary user computing device not matching the secondary user computing device stored in the user profile, generating and transmitting the authentication challenge to the primary user computing device, receiving a response from the primary user computing device to the authentication challenge, and determining whether the online user is verified based on the response;

generate an authentication response to the authentication request, wherein the authentication response includes one of an authentication approval of the online user when the online user is verified or an authentication denial of the online user when the online user is not verified;

transmit the authentication response to the merchant; and update the authentication table in response to receiving subsequent transaction data associated with the user account information, wherein updating the authentication table comprises adding an additional secondary user computing device identifier to the authentication table in response to detecting the additional secondary user computing device identifier in the subsequent transaction data, thereby enabling the PCA system to subsequently authenticate the online user using up-to-date data associated with the personal cloud platform of the online user.

2. The PCA system of claim 1, wherein the processor is further configured to parse the transaction data using the user account information.

3. The PCA system of claim 1, wherein the processor is further configured to receive the first primary user computing device identifier and the first secondary user computing device identifier when the primary user computing device is paired with the secondary user computing device.

4. The PCA system of claim 1, wherein the processor is further configured to receive the first primary user computing device identifier and the first secondary user computing device identifier when the primary user computing device is not paired with the secondary user computing device, wherein the first primary user computing device identifier and the first secondary user computing device identifier are stored in the primary user computing device.

5. The PCA system of claim 1, wherein the second primary user computing device identifier is associated with the primary user computing device and the second secondary user computing device identifier is associated with the secondary user computing device.

6. The PCA system of claim 1, wherein the processor is further configured to receive the second primary user computing device identifier and the second secondary user computing device identifier when the primary user computing device is paired with the secondary user computing device.

7. The PCA system of claim 1, wherein the processor is further configured to receive the second primary user computing device identifier and the second secondary user computing device identifier when the primary user computing device is not paired with the secondary user computing device, wherein the second primary user computing device identifier and the second secondary user computing device identifier are stored in the primary user computing device.

8. A computer-implemented method for authenticating an online user via a personal cloud authentication (PCA) service using device data stored on a personal cloud platform of the online user, said method implemented using a personal cloud authentication (PCA) system including one or more personal cloud authentication (PCA) computing devices in communication with a memory, said method comprising:

storing, within a database, enrollment data as a user profile associated with the online user, the enrollment data including a first primary user computing device identifier associated with a primary user computing device and a first secondary user computing device identifier associated with a secondary user computing device;

building, within the database, an authentication table using the user profile, wherein the user profile includes a user identifier, authentication signatures, user account information, the first primary user computing device identifier, and the first secondary user computing device identifier;

receiving, from a merchant, transaction data associated with the user account information, the transaction data corresponding to a payment transaction;

storing the transaction data within the database, wherein the transaction data includes at least an authentication request, a second primary user computing device identifier and a second secondary user computing device identifier, the second secondary user computing device identifier indicative of a pairing between a candidate secondary user computing device and a candidate primary user computing device identified by the second primary user computing device identifier;

parsing the transaction data;

extracting the second primary user computing device identifier and the second secondary user computing device identifier from the transaction data;

comparing the first primary user computing device identifier stored in the user profile to the extracted second primary user computing device identifier, and the first secondary user computing device identifier stored in the user profile to the extracted second secondary user computing device identifier;

determining whether an authentication challenge is required to verify the online user based on the comparison, wherein:

a) in response to i) the candidate primary user computing device matching the primary user computing device stored in the user profile and ii) the candidate secondary user computing device matching the secondary user computing device stored in the user profile, determining that the authentication challenge is not required and the online user is verified; and b) in response to i) the candidate primary user computing device matching the primary user computing device stored in the user profile and ii) the candidate secondary user computing device not matching the secondary user computing device stored in the user profile, generating and transmitting the authentication challenge to the primary user computing device, receiving a response from the primary user computing device to the authentication challenge, and determining whether the online user is verified based on the response;

generating an authentication response to the authentication request, wherein the authentication response includes one of an authentication approval of the online user when the online user is verified or an authentication denial of the online user when the online user is not verified;

transmitting the authentication response to the merchant; and updating the authentication table in response to receiving subsequent transaction data associated with the user account information, wherein updating the authentication table comprises adding an additional secondary user computing device identifier to the authentication table in response to detecting the additional secondary user computing device identifier in the subsequent transaction data, thereby enabling the PCA system to subsequently authenticate the online user using up-to-date data associated with the personal cloud platform of the online user.

9. The method of claim 8 further comprising parsing the transaction data using the user account information.

10. The method of claim 8 further comprising receiving the first primary user computing device identifier and the first secondary user computing device identifier when the primary user computing device is paired with the secondary user computing device.

11. The method of claim 8 further comprising receiving the first primary user computing device identifier and the first secondary user computing device identifier when the primary user computing device is not paired with the secondary user computing device, wherein the first primary user computing device identifier and the first secondary user computing device identifier are stored in the primary user computing device.

12. The method of claim 8 wherein the second primary user computing device identifier is associated with the primary user computing device and the second secondary user computing device identifier is associated with the secondary user computing device.

13. The method of claim 8 further comprising receiving the second primary user computing device identifier and the second secondary user computing device identifier when the primary user computing device is paired with the secondary user computing device.

14. The method of claim 8 further comprising receiving the second primary user computing device identifier and the second secondary user computing device identifier when the primary user computing device is not paired with the secondary user computing device, wherein the second primary user computing device identifier and the second secondary user computing device identifier are stored in the primary user computing device.

15. A non-transitory computer-readable storage medium having computer-executable instructions embodied thereon, wherein when executed by one or more personal cloud authentication (PCA) computing devices of a personal cloud authentication (PCA) system, the one or more PCA computing devices having at least one processor coupled to at least one memory device, the computer-executable instructions cause the at least one processor to:

store, within a database, enrollment data as a user profile associated with and online user, the enrollment data including a first primary user computing device identifier associated with a primary user computing device and a first secondary user computing device identifier associated with a secondary user computing device;

build, within a database, an authentication table using the user profile, wherein the user profile includes a user identifier, authentication signatures, user account information, the first primary user computing device identifier, and the first secondary user computing device identifier;

receive, from a merchant, transaction data associated with the user account information, the transaction data corresponding to a payment transaction;

store the transaction data within the database, wherein the transaction data includes at least an authentication request, a second primary user computing device identifier and a second secondary user computing device identifier, the second secondary user computing device identifier indicative of a pairing between a candidate secondary user computing device and a candidate primary user computing device identified by the second primary user computing device identifier;

parse the transaction data;

extract the second primary user computing device identifier and the second secondary user computing device identifier from the transaction data;

compare the first primary user computing device identifier stored in the user profile to the extracted second primary user computing device identifier, and the first secondary user computing device identifier stored in the user profile to the extracted second secondary user computing device identifier;

determine whether an authentication challenge is required to verify the online user based on the comparison, wherein:

a) in response to i) the candidate primary user computing device matching the primary user computing device stored in the user profile and ii) the candidate secondary user computing device matching the secondary user computing device stored in the user profile, determining that the authentication challenge is not required and the online user is verified; and b) in response to i) the candidate primary user computing device matching the primary user computing device stored in the user profile and ii) the candidate secondary user computing device not matching the secondary user computing device stored in the user profile, generating and transmitting the authentication challenge to the primary user computing device, receiving a response from the primary user computing device to the authentication challenge, and determining whether the online user is verified based on the response;

generate an authentication response to the authentication request, wherein the authentication response includes one of an authentication approval of the online user when the online user is verified or an authentication denial of the online user when the online user is not verified;

transmit the authentication response to the merchant; and update the authentication table in response to receiving subsequent transaction data associated with the user account information, wherein updating the authentication table comprises adding an additional secondary user computing device identifier to the authentication table in response to detecting the additional secondary user computing device identifier in the subsequent transaction data, thereby enabling the PCA system to subsequently authenticate the online user using up-to-date data associated with a personal cloud platform of the online user.

16. The non-transitory computer-readable storage medium of claim 15, wherein the computer-executable instructions further cause the at least one processor to parse the transaction data using the user account information.

17. The non-transitory computer-readable storage medium of claim 15, wherein the computer-executable instructions further cause the at least one processor to receive the first primary user computing device identifier and the first secondary user computing device identifier when the primary user computing device is paired with the secondary user computing device.

18. The non-transitory computer-readable storage medium of claim 15, wherein the computer-executable instructions further cause the at least one processor to receive the first primary user computing device identifier and the first secondary user computing device identifier when the primary user computing device is not paired with the secondary user computing device, wherein the first primary user computing device identifier and the first secondary user computing device identifier are stored in the primary user computing device.

19. The non-transitory computer-readable storage medium of claim 15, wherein the computer-executable instructions further cause the at least one processor to receive the second primary user computing device identifier and the second secondary user computing device identifier when the primary user computing device is paired with the secondary user computing device.

20. The non-transitory computer-readable storage medium of claim 15, wherein the computer-executable instructions further cause the at least one processor to receive the second primary user computing device identifier and the second secondary user computing device identifier when the primary user computing device is not paired with the secondary user computing device, wherein the second primary user computing device identifier and the second secondary user computing device identifier are stored in the primary user computing device.

21. The PCA system of claim 1, wherein the processor is further configured to approve the payment transaction in response to determining that the candidate secondary user computing device is the secondary user computing device.

\* \* \* \* \*